UNITED STATES PATENT OFFICE.

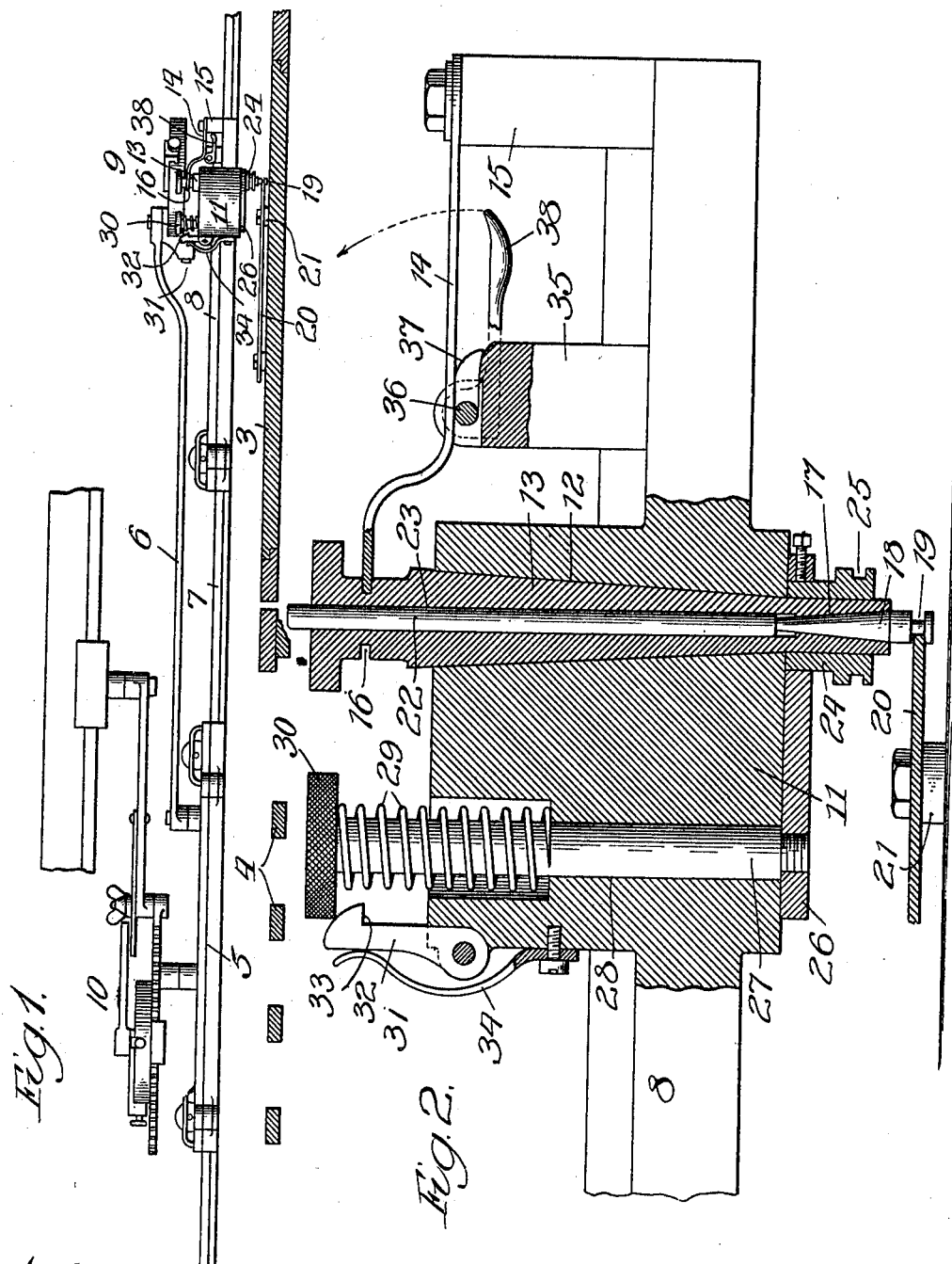

CHARLES E. REED, OF CHICAGO, ILLINOIS, ASSIGNOR TO CHARLES E. REED & COMPANY, OF CHICAGO, ILLINOIS, A CORPORATION OF ILLINOIS.

PATTERN-CUTTING MACHINE.

978,486.  Specification of Letters Patent.  Patented Dec. 13, 1910.

Application filed June 2, 1910. Serial No. 564,565.

*To all whom it may concern:*

Be it known that I, CHARLES E. REED, a citizen of the United States, residing at Chicago, in the county of Cook and State of Illinois, have invented a new and useful Improvement in Pattern-Cutting Machines, of which the following is a specification.

My invention relates more particularly to improvements in pattern-cutting machines of the pantographic type involving, generally stated, a support for the pattern-model usually made from sheet metal, means for supporting the sheet of material from which the patterns, usually of tar board, are to be cut, and which afterward have their edges bound with metal, and a pantographic frame provided at one end with a stylus, or tracer, designed in the operation of the machine to be applied to the edge of the pattern-model and moved along the edges to cause the stylus to travel in a path corresponding to the outline of the model, and means at the other end of the frame for cutting a pattern of the same outline as the model, my invention being designed primarily as an improvement on the machine forming the subject-matter of United States Reissue Letters Patent No. 11,569, granted to me on the 29th of September, 1896, the pattern-cutting means of this patented construction comprising a die formed of male and female members between which the sheet is embraced and which is adapted to be rapidly reciprocated as it is moved along the sheet to cut the pattern.

It is desirable that patterns for cutting the pieces to be sewed together to form the sewed article be provided of the same shape and size as such pieces, both with and without the folded or lap edges through which the pieces are stitched in making the finished article.

As machines have hitherto been constructed, the making of a pattern of a shape corresponding to the piece to be cut therefrom having a lap or folded, edge or edges, is impossible, as machines of this type while capable of being adjusted for the cutting of patterns of different sizes from one pattern-model cannot be adjusted for producing a pattern providing for a lap or laps or folded edges.

My object is to provide means in a pantographic pattern-cutting machine for cutting patterns of a shape corresponding to the pieces to be cut therefrom both with and without the lap or laps, or folded edges, as desired.

Referring to the accompanying drawing in which my improvement is illustrated as applied to the machine forming the subject of said Letters Patent—Figure 1 is a view in elevation, and partly sectional, of the upper portion of the machine showing the pantographic frame, model support and model thereon in elevation and the bed of the machine in section; and Fig. 2, a view in vertical sectional elevation of the tracer, or stylus, equipped head carried on one end of the pantographic frame for coöperation with the pattern-model.

The bed of the machine carried by the frame (not shown) and which is formed of a section 3 and adjacent thereto with spaced members 4, is surmounted by a movable pantographic frame of which the members 5, 6, 7 and 8 form a part, the adjustable tracer-head wherein my present invention lies being represented at 9 and the means for adjusting the opposite end of the pantographic frame being illustrated at 10, the parts described, excepting certain details of the head 9, being of the same construction and operating in the same manner as those of the machine illustrated and described in the above-referred to patent.

The outer end of the bar 8 is formed with a head 11 containing a downwardly tapering bore 12 in which a tapered plug 13 is located, this plug being normally held in close engagement with the wall of the bore 12 by means of a leaf-spring 14 secured at one end to a standard 15 on the bar 8 and extending at its free end, which is preferably bifurcated, into an annular groove 16 in the upper end of the plug 13. The lower end of the plug 13, the external diameter of which is preferably uniform, contains an upwardly tapered socket 17 in which a tapered tracer-point 18 is driven, the lower end of this point containing a peripheral groove 19 for receiving the edge of the pattern-model, such as that represented at 20 as supported on studs 21, and permitting the tracer to be guided in its movements around the edge of the model in the operation of producing a pattern. The plug 13 contains an upright rod 22 slidably confined in an opening 23 therein and resting on the upper end of the tracer-point 18, whereby removal of the latter from the plug 13 may be readily effected by striking the rod 22 on its upper end.

Surrounding the lower end of the plug 13 and slidable thereon is a sleeve 24 which contains a peripheral groove 25 like the groove 19 but of larger circumference, this sleeve being secured to a plate 26 connected with the lower end of a plunger 27 slidable in an opening 28 in the head 11 and normally held in raised position, in which the sleeve 24 occupies the position represented in Fig. 2, by a coiled-spring 29 surrounding the plunger 27 and confined between a portion of the head 11 and the head 30 of this plunger.

It will be readily understood from the foregoing description that when it is desired to form an offset portion on an edge, or edges, of the pattern to be cut, to represent the lap or folded edge, or edges, for sewing, the tracer-point 18 will be moved around the pattern-model, excepting on those edges which correspond with the edge or edges of the pattern to be cut for the lap, or folded-edge, allowance, and thereupon the plunger 27 forced downward to cause the plate 26 to be lowered and the sleeve 24 to slide downward on the plug 13 to a position in which it will extend at its groove 25 into the same horizontal plane occupied by the groove 19. The sleeve 24, having been thus positioned, is then rearwardly moved in contact at its groove 25 with the edge, or edges, of the pattern-model corresponding to those of the pattern which are to be cut with the lap or folded-edge allowance, whereby a pattern shaped exactly like the piece desired to be cut therefrom with lap, or folded-edge allowance, is produced.

In order that the operation of adjusting the larger tracer 24 may be easily effected and the adjustment maintained until readjustment is desired, I provide a spring-catch 31 the arm of which represented at 32 is pivoted on the head 11 and is pressed at its shouldered-end 33 by a spring 34 into the path of the head 30 of the plunger 27, the end of the catch being so constructed as to cause the plunger-head to automatically lock with the shoulder 33 when the plunger is depressed for lowering the sleeve 26, and be manually disengageable therefrom as desired.

As the tracer-point is a delicate part of the machine, it is desirable that it be so mounted on the head 11 as to permit it to be readily withdrawn from exposed condition when not in use. To this end I provide on an upright 35 secured to the head 11, a rock-shaft 36 carrying a cam-finger 37 and actuated manually by a lever 38, whereby when the handle is turned in the direction indicated by the arrow in Fig. 2 the finger 37 will raise the spring 14 thereby lifting the plug and tracer member 18 to a position in which the member 18 will be withdrawn from exposed position.

What I claim as new and desire to secure by Letters Patent, is—

1. In a machine of the character set forth, a tracer, or stylus, provided with a plurality of grooves arranged in stepped relation, for the purpose set forth.

2. In a machine of the character set forth, a tracer, or stylus, provided with a plurality of tracing surfaces arranged in stepped relation, for the purpose set forth.

3. In a machine of the character set forth, a tracer, or stylus, provided with relatively adjustable grooved tracing devices, for the purpose set forth.

4. In a machine of the character set forth, a tracer, or stylus, provided with a plurality of relatively adjustable concentric tracing devices, for the purpose set forth.

5. In a machine of the character set forth, a tracer, or stylus, provided with a plurality of concentric peripherally-grooved tracing devices, for the purpose set forth.

6. In a machine of the character set forth, a tracer, or stylus, provided with a fixed tracer-device and a second tracer device in the form of a sleeve surrounding said tracer-device and adjustable longitudinally thereon.

7. In a machine of the character set forth, a tracer, or stylus, provided with relatively adjustable tracing devices one of which is spring-controlled to extend out of registration with the other of said tracing devices.

8. In a machine of the character set forth, a tracer, or stylus, provided with relatively adjustable tracing devices one of which is spring-controlled to extend out of registration with the other of said tracing devices, and means for releasably holding said spring-controlled tracing-device in adjustable position.

9. In a machine of the character set forth, a tracer, or stylus, provided with relatively adjustable tracing-devices one of which is spring-controlled to extend out of registration with the other of said tracing-devices, and a catch-device for releasably holding said spring-controlled tracing-device in adjusted position.

10. In a machine of the character set forth, a head, a tracer-device fixed on said head, a second tracing-device surrounding said first-named tracer-device and movable relative thereto, and a spring-controlled plunger connected with said movable tracing-device, for the purpose set forth.

11. In a machine of the character set forth, a head containing an opening the wall of which affords a seat, a plug in said opening and projecting below said head, a tracer-device carried by said plug, and a sleeve slidably mounted on the projecting portion of said plug and forming a second tracing-device, for the purpose set forth.

12. In a machine of the character set forth, a head containing a downwardly-tapering opening forming a seat, a plug fitting in said opening and extending below the head, a tracer-device secured to said plug, and a sleeve slidably mounted on the projecting end of said plug and forming a second tracing-device, for the purpose set forth.

13. In a machine of the character set forth, a tracer-head provided with an upwardly-tapering opening extending through the head, a tracer-point having drive engagement with the walls of the tapered opening, and a rod in said opening seated against the small end of said tracer-point, for the purpose set forth.

CHARLES E. REED.

In presence of—
R. A. SCHAEFER,
J. WILSON.